US012686826B2

(12) United States Patent
Chabot et al.

(10) Patent No.: US 12,686,826 B2
(45) Date of Patent: Jul. 21, 2026

(54) HYDROCONVERSION PROCESSES WITH EBULLATED BED REACTORS AND INTER-STAGE WATER ADDITION

(71) Applicant: Chevron U.S.A. Inc., San Ramon, CA (US)

(72) Inventors: Julie Chabot, Novato, CA (US); Michael Shawn McMullin, Sonoma, CA (US); Bo Kou, Albany, CA (US); Audrey Lane Avecilla, San Mateo, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 306 days.

(21) Appl. No.: 18/551,449

(22) PCT Filed: Mar. 22, 2022

(86) PCT No.: PCT/US2022/021229
§ 371 (c)(1),
(2) Date: Sep. 20, 2023

(87) PCT Pub. No.: WO2022/204073
PCT Pub. Date: Sep. 29, 2022

(65) Prior Publication Data
US 2024/0318088 A1     Sep. 26, 2024

Related U.S. Application Data

(60) Provisional application No. 63/165,478, filed on Mar. 24, 2021.

(51) Int. Cl.
*C10G 47/00*     (2006.01)
*B01J 8/22*     (2006.01)
(Continued)

(52) U.S. Cl.
CPC .............. *C10G 47/30* (2013.01); *B01J 8/22* (2013.01); *B01J 8/26* (2013.01);
(Continued)

(58) Field of Classification Search
CPC   C10G 47/30; C10G 65/02; C10G 2300/1077; C10G 2300/1074;
(Continued)

(56) References Cited

U.S. PATENT DOCUMENTS 3,501,396 A     3/1970   Gatsis
3,753,894 A     8/1973   Shoemaker et al.
(Continued)

FOREIGN PATENT DOCUMENTS

GB     1468160 A     3/1977
GB     1505886 A     3/1978
GB     1525508 A     9/1978

OTHER PUBLICATIONS

International Search Report and Written Opinion for PCT/US2022/021229 dated Jun. 27, 2022.

*Primary Examiner* — Prem C Singh
*Assistant Examiner* — Brandi M Doyle
(74) *Attorney, Agent, or Firm* — King & Spalding LLP

(57)     ABSTRACT

Embodiments of the disclosure include processes for hydroconversion of hydrocarbon feedstocks in ebullated bed reactor systems. In particular, the systems comprise two or more ebullated bed reactors comprising catalyst particles, one or more inter-stage separation vessels, which are in fluid communication, and allow for the introduction of an additional solvent into the system between the final inter-stage separation vessel and the final ebullated bed reactor in the flow path. The processes include the addition of a solvent com-
(Continued)

prising water to an inter-stage liquid product prior to contact with the final ebullated bed reactor, which improves catalytic performance.

20 Claims, 1 Drawing Sheet

(51) Int. Cl.
*B01J 8/26* (2006.01)
*C10G 47/30* (2006.01)

(52) U.S. Cl.
CPC ................ *C10G 2300/1059* (2013.01); *C10G 2300/107* (2013.01); *C10G 2300/1074* (2013.01); *C10G 2300/1077* (2013.01)

(58) Field of Classification Search
CPC ....... C10G 2300/1059; C10G 2300/107; B01J 8/22; B01J 8/26
See application file for complete search history.

(56) References Cited

U.S. PATENT DOCUMENTS

| 4,013,637 | A | 3/1977 | Eberly |
|---|---|---|---|
| 4,052,295 | A | 10/1977 | Pronk |
| 4,886,644 | A | 12/1989 | Chan et al. |
| 5,624,642 | A | 4/1997 | Devanathan et al. |
| 6,620,311 | B2 | 9/2003 | Morel et al. |
| 7,060,228 | B2 | 6/2006 | Brunard et al. |
| 7,449,155 | B2 | 11/2008 | Kao et al. |
| 7,820,120 | B2 | 10/2010 | Kemoun |
| 9,035,115 | B2 | 5/2015 | Chen et al. |
| 9,162,207 | B2 | 10/2015 | Jia et al. |
| 9,255,229 | B2 | 2/2016 | Borremans et al. |
| 9,314,759 | B2 | 4/2016 | Song et al. |
| 9,440,894 | B2 | 9/2016 | Baldassari et al. |
| 10,507,447 | B1 | 12/2019 | Amblard et al. |
| 2002/0056664 | A1 | 5/2002 | Chabot |
| 2011/0017635 | A1* | 1/2011 | Chabot .................. C10G 47/02 208/112 |
| 2013/0056394 | A1 | 3/2013 | Ancheyta Juarez et al. |
| 2019/0270941 | A1 | 9/2019 | Amblard et al. |
| 2019/0321753 | A1 | 10/2019 | Amblard et al. |

\* cited by examiner

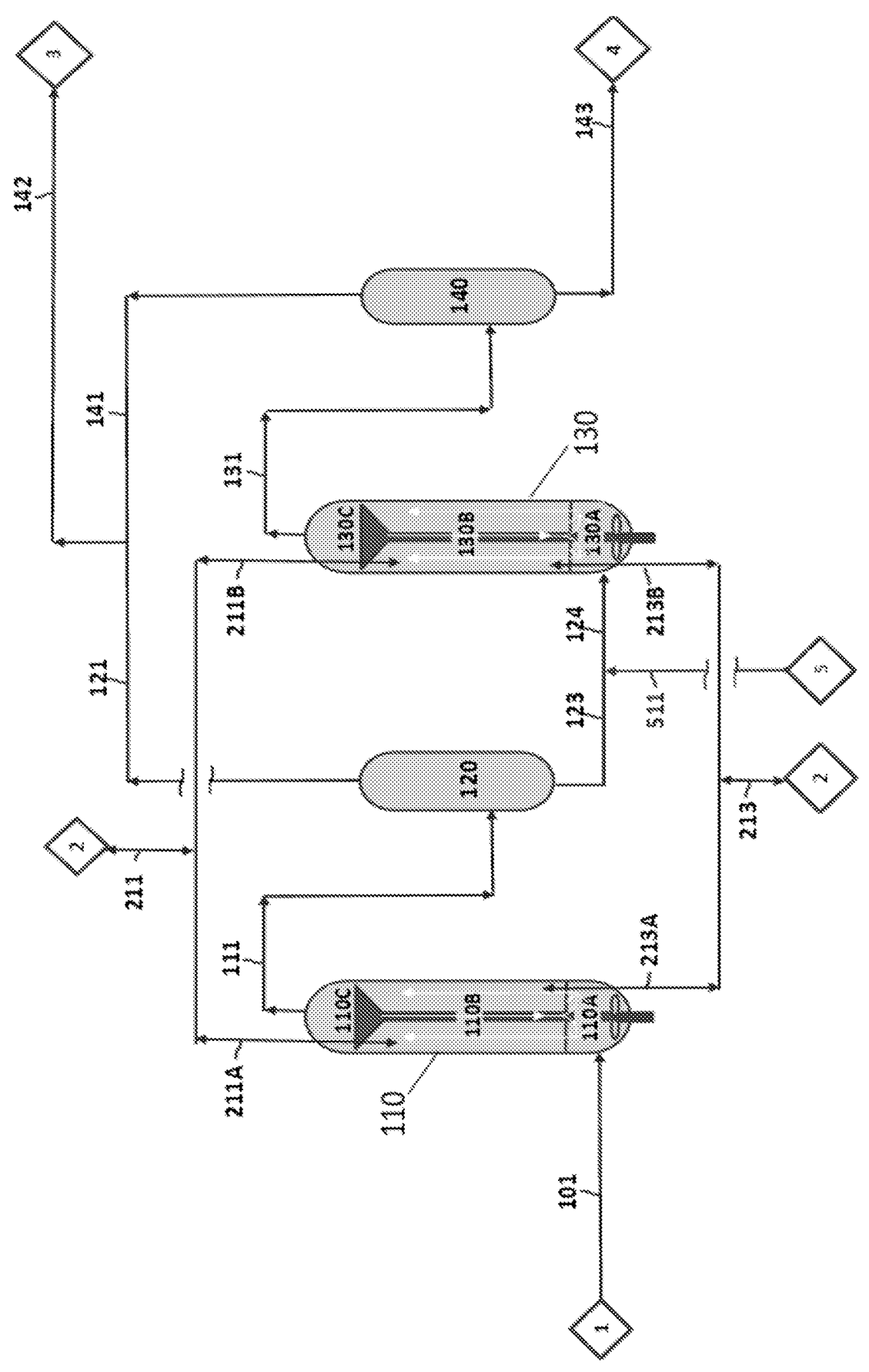

HYDROCONVERSION PROCESSES WITH EBULLATED BED REACTORS AND INTER-STAGE WATER ADDITION

RELATED APPLICATIONS

The present application is a 371 national phase application of PCT/US2022/021229 filed Mar. 22, 2022, which application claims priority to U.S. Provisional Patent Application No. 63/165,478 filed Mar. 24, 2021. The entire contents of the foregoing applications are incorporated herein by reference.

TECHNICAL FIELD

The present disclosure relates to processes for hydroconversion of hydrocarbon feedstocks using ebullated bed reactor systems with solvent addition to preserve catalyst reactor and catalyst performance.

BACKGROUND

Converting heavy oil into useful end products requires extensive processing, including reducing the boiling point of the heavy oil, increasing the hydrogen-to-carbon ratio, and removing impurities such as metals, sulfur, nitrogen and high carbon forming compounds. Examples of catalytic hydroconversion processes using conventional supported catalysts to upgrade atmospheric tower bottoms include fixed bed hydroprocessing, ebullated or expanded bed hydroprocessing, and moving bed hydroprocessing. Existing commercial catalytic hydrocracking processes involve rapid catalyst deactivation and high catalyst cost, making them less suitable for hydroprocessing vacuum tower bottoms unless substantially diluted with lower boiling fractions, such as atmospheric tower bottoms.

A major cause of catalyst and equipment fouling is the undesired formation of coke and sediment, which often results when asphaltenes are heated to the high temperatures required to effect catalytic and thermal cracking. Supported catalysts used in commercial hydrocracking processes such as fixed-bed and ebullated bed processes utilize solid supported catalysts that include clusters of catalytic sites located within pores or channels in the support material. Most heavy oil feedstocks contain a significant portion of asphaltene molecules, which are either too large to enter the pores of the catalyst support or else become trapped within the pores. Asphaltene molecules that become trapped in the pores deactivate the catalyst sites in the blocked pores. In this way, smaller asphaltene molecules can progressively block all catalyst sites, entirely deactivating the catalyst.

Moreover, larger asphaltene molecules form free radicals, which react with similar asphaltene and other free radicals in the feedstock, thereby forming larger molecules which continue increasing in size and that can foul both the catalyst and the hydroprocessing equipment through the formation of coke precursors and sediment. The undesirable reactions and fouling involving asphaltene greatly increase the catalyst and maintenance costs of ebullated bed and fixed-bed hydrocracking processes.

Another problem associated with conventional ebullated bed hydrocracking processes is the need to carefully control the temperature and rapidly disperse the heat that accumulates within any stagnant areas which may or may not be present throughout the entire bed. Because many hydroconversion reactions are exothermic, and because heat can increase the rate of certain reactions, the formation of stagnant spots when the supported catalyst particles are not properly fluidized within the ebullated bed reactor can result in reactions that quickly get out of control. Stagnant spots of increased temperature can promote the formation of coke precursors and sediment, which can bind the catalyst particles together to form catalyst balls that are too heavy to be fluidized. Exothermic reactions tend to persist around the catalyst balls and stagnant zones.

In view of the foregoing, there is an ongoing need to provide improved ebullated bed hydroconversion processes which minimize catalyst and equipment fouling.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

Aspects of this disclosure are directed to processes for hydroconversion of hydrocarbon feedstocks.

In one aspect, a process for hydroconversion of a hydrocarbon feedstock comprises:

(i) contacting hydrocarbon feedstock and hydrogen in a first ebullated bed reactor containing catalyst particles to produce a first liquid stream and a first mixed stream consisting of liquid products and gas products;

(ii) separating the first mixed stream in an inter-stage separation vessel to form an inter-stage gas product and an inter-stage liquid product;

(iii) combining the inter-stage liquid product with a solvent comprising water in an amount of about 0.001 weight % to about 10 weight % of the inter-stage liquid product;

(iv) contacting the inter-stage liquid product and solvent in a second ebullated bed reactor containing catalyst particles to produce a second liquid stream and a second mixed stream consisting of liquid products and gas products;

(v) separating the second mixed stream in a high-temperature and high-pressure separation vessel to form a final gas product and a final liquid product; and wherein at least a portion of the first liquid stream is returned to the first ebullated bed reactor containing catalyst particles and at least a portion of the second liquid stream is returned to the second ebullated bed reactor containing catalyst particles.

In another aspect, a process for hydroconversion of a hydrocarbon feedstock comprises:

(i) contacting hydrocarbon feedstock and hydrogen in a first ebullated bed reactor containing catalyst particles to produce a first liquid stream and a first mixed stream consisting of liquid products and gas products;

(ii) separating the first mixed stream in an inter-stage separation vessel to form an inter-stage gas product and an inter-stage liquid product;

(iii) contacting the inter-stage liquid product and a solvent in a second ebullated bed reactor containing catalyst particles to produce a second liquid stream and a second mixed stream consisting of liquid products and gas products;

(iv) separating the second mixed stream in an inter-stage separation vessel to form a second inter-stage gas product and a second inter-stage liquid product;

(v) combining the second inter-stage liquid product with a second solvent comprising water in an amount of about 0.001 weight % to about 10 weight % of the second inter-stage liquid product;

(vi) contacting the second inter-stage liquid product and the second solvent in a third ebullated bed reactor containing catalyst particles to produce a third liquid stream and a third mixed stream consisting of liquid products and gas products;

(vii) separating the third mixed stream in a high-temperature and high-pressure separation vessel to form a final gas product and a final liquid product; and wherein at least a portion of the first liquid stream is returned to the first ebullated bed reactor containing catalyst particles, at least a portion of the second liquid stream is returned to the second ebullated bed reactor containing catalyst particles and at least a portion of the third liquid stream is returned to the third ebullated bed reactor containing catalyst particles.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

FIG. 1 is a flow diagram illustrating an exemplary hydroconversion process.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in the Detailed Description section in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

The terms "catalyst particles", "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions.

The term "hydroconversion" refers to hydrotreating and/or hydrocracking of hydrocarbon feedstocks into hydrocarbon products.

The terms "resid" or "residuum", as used herein, refers to oil products that remain after petroleum has been distilled, such as residual oil, crude, crude oil, fossil oil, petroleum, rock oil, and the like. Vacuum resid is the heaviest of the distillation cuts.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any members of a claimed group.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION

It is to be understood that the disclosure is not limited in its application to the details of construction and the arrangement of components set forth in the following description or illustrated in the drawings.

The present disclosure generally relates to processes for hydroconversion of a hydrocarbon feedstock or to processes for upgrading petroleum feedstocks. In a particular embodiment, the process is for hydrocracking resid. Hydroconversion processes disclosed herein may be used for reacting hydrocarbon feedstocks at conditions of elevated temperatures and pressures in the presence of hydrogen and hydroconversion catalyst particles to convert the feedstock to lower molecular weight products with reduced contaminant levels. Hydroconversion processes are those used for hydrotreating or hydrocracking of a hydrocarbon feedstock, and may include, for example, hydrogenation, desulfurization, denitrogenation, cracking, conversion, and removal of metals, Conradson Carbon or asphaltenes, etc. In one embodiment, the hydroconversion process comprises hydrocracking and/or hydrotreating of hydrocarbon feedstocks.

In certain embodiments, the processes described herein may provide for an advantageous manner of capturing heavy metals, such as vanadium, within the extrudate catalyst structure. Heavy metals may be stored on the catalyst in a more compact form, preserving open access to catalyst pore volume, also mitigating the rate of catalyst fouling by deposition of such metals.

In certain embodiments, the processes described herein may provide improvements in sulfur removal. For example, sulfur removal may be enhanced in residuum hydrocracking through the improved vanadium management achieved by processes according to the embodiments.

As an additional advantage of the processes described herein, higher residuum conversion for a given sediment value may also occur, due to radical scavenging and thermal cracking mediation.

In aspects, this disclosure describes processes which utilize a system, or a reaction section, which comprises two or more ebullated bed reactors comprising catalyst particles, one or more inter-stage separation vessels, for example flash vessels, which are in fluid communication, and allow for the introduction of an additional solvent into the system between the final inter-stage separation vessel and the final ebullated bed reactor in the flow path. Advantageously, the process includes the step of combining the liquid product of the final inter-stage separation vessel with a solvent comprising water prior to contacting the combination of the liquid portion and the solvent with the final ebullated bed reactor comprising catalyst particles (e.g. second or third of 2- or 3-ebullated bed reactor systems, respectively). Addition of the solvent comprising water to the inter-stage liquid product prior to contact with the final ebullated bed reactor in the process improves catalytic performance within the system, and in particular, within the ebullated bed reactor. In certain embodiments, the addition of the solvent is by injection.

The system may further comprise other components for hydroconversion of the hydrocarbon feedstock, for example a high-temperature and high-pressure separation vessel, which receives a mixed product stream from the final ebullated bed reactor in the process. Generally, the high-temperature and high-pressure separation vessel operates at a minimum temperature of about 360° C. and a minimum pressure of about 110 bars for the processes described herein. In certain embodiments, the high-temperature and high-pressure separation vessel operates at a temperature in the range of about 360° C. to about 440° C. and a pressure in the range of about 110 bars to about 180 bars.

In one embodiment, a process for hydroconversion of a hydrocarbon feedstock comprises:

(i) contacting hydrocarbon feedstock and hydrogen in a first ebullated bed reactor containing catalyst particles to produce a first liquid stream and a first mixed stream consisting of liquid products and gas products;

(ii) separating the first mixed stream in an inter-stage separation vessel to form an inter-stage gas product and an inter-stage liquid product;

(iii) combining the inter-stage liquid product with a solvent comprising water in an amount of about 0.001 weight % to about 10 weight % of the inter-stage liquid product;

(iv) contacting the inter-stage liquid product and solvent in a second ebullated bed reactor containing catalyst particles to produce a second liquid stream and a second mixed stream consisting of liquid products and gas products;

(v) separating the second mixed stream in a separation vessel to form a final gas product and a final liquid product; and wherein at least a portion of the first liquid stream is returned to the first ebullated bed reactor containing catalyst particles and at least a portion of the second liquid stream is returned to the second ebullated bed reactor containing catalyst particles.

Such a process could also be carried out with a system comprising three ebullated bed reactors containing catalyst particles, two inter-stage separation vessels and a high-temperature and high-pressure separation vessel to form a final gas product and a final liquid product.

In another embodiment, a process for hydroconversion of a hydrocarbon feedstock comprises:

(i) contacting hydrocarbon feedstock and hydrogen in a first ebullated bed reactor containing catalyst particles to produce a first liquid stream and a first mixed stream consisting of liquid products and gas products;

(ii) separating the first mixed stream in an inter-stage separation vessel to form an inter-stage gas product and an inter-stage liquid product;

(iii) contacting the inter-stage liquid product and solvent in a second ebullated bed reactor containing catalyst particles to produce a second liquid stream and a second mixed stream consisting of liquid products and gas products;

(iv) separating the second mixed stream in an inter-stage separation vessel to form a second inter-stage gas product and a second inter-stage liquid product;

(v) combining the second inter-stage liquid product with a solvent comprising water in an amount of about 0.001 weight % to about 10 weight % of the second inter-stage liquid product;

(vi) contacting the second inter-stage liquid product and solvent in a third ebullated bed reactor containing catalyst particles to produce a third liquid stream and a third mixed stream consisting of liquid products and gas products;

(vii) separating the third mixed stream in a separation vessel to form a final gas product and a final liquid product; and wherein at least a portion of the first liquid stream is returned to the first ebullated bed reactor containing catalyst particles, at least a portion of the second liquid stream is returned to the second ebullated bed reactor containing catalyst particles and at least a portion of the third liquid stream is returned to the third ebullated bed reactor containing catalyst particles.

Hydrocarbon feedstocks useful in embodiments disclosed herein may include residuum hydrocarbon feedstocks, such as various refinery and other hydrocarbon streams which may include contaminant metals (e.g. vanadium). For example, residuum hydrocarbon feedstocks may include petroleum atmospheric or vacuum residue, deasphalted oil, deasphalter pitch, hydrocracked atmospheric tower or vacuum tower bottom, straight run vacuum gas oil, hydrocracked vacuum gas oil, fluid catalytically cracked (FCC)

slurry oils, as well as other similar hydrocarbon streams, and a combination of these, each of which may be straight run, process derived, hydrocracked, partially desulfurized, and/or low-metal streams. The initial boiling point of the resid is typically greater than about 260° C. In some embodiments, residuum hydrocarbon fractions may include hydrocarbons having a normal boiling point of at least about 480° C. The final boiling point of the resid may be in the range of about 340° C. to about 620° C., or higher.

Initial Hydroconversion Step

At the beginning of the processes according to the embodiments, the hydrocarbon feedstock enters the first ebullated bed reactor as a hydrocarbon feed stream from a hydrocarbon feed system. Any suitable hydrocarbon feed system may be used. In some embodiments, the hydrocarbon feedstock is prepared by feeding a feed oil, for example a vacuum resid, to a feed oil surge drum upstream of the ebullated bed reactor. The effluent from the feed oil surge drum may be pressurized in a feed oil pump, and subsequently heated in a feed oil heater, thereby producing a heated feed oil. In certain embodiments, the heated feed oil may be combined with a hot feed gas, such as hydrogen, the combination being fed to the first ebullated bed reactor. In particular, the hydrocarbon feed (or heated feed oil, alone or in combination with feed gas) is introduced to the plenum mixing zone of the first ebullated bed reactor.

At this point in the process, the step of contacting hydrocarbon feedstock and hydrogen in a first ebullated bed reactor containing catalyst particles to produce a first liquid stream and a first mixed stream consisting of liquid products and gas products occurs. Within the ebullated bed reactor, the hydrocarbon feed and hydrogen flows from the plenum mixing zone to the catalytic reaction zone for contact with catalyst particles (e.g. hydroconversion catalyst particles). In certain embodiments, this occurs through a distribution grid. The hydrocarbon feedstock, hydrogen and catalyst particles react to form reaction products, which are recovered as first hydroconverted products in the separation zone of the ebullated bed reactor.

In the separation zone, the reaction products are separated into a liquid product and a mixed product consisting of both liquid product and gas product. Generally, the liquid product is at least 80% liquid by weight. The mixed product comprises about 80% to about 95%, or about 90% to about 95%% liquid by weight and about 5% to about 20%, or about 5% to about 10% gas by weight. A portion of the first liquid product is pumped into the plenum mixing zone of the first ebullated bed reactor through a recirculation line. The mixed product consisting of both liquid product and gas product is routed to an inter-stage separation vessel.

Generally, the ebullated bed reactors useful in the process each include a catalytic reaction zone for hydroconversion (e.g., hydrotreating or hydrocracking) of the hydrocarbon feedstocks. Ebullated bed reactors are fluidized bed reactors that utilize ebullition to achieve appropriate distribution of reactants and catalysts. The ebullated bed technology utilizes a three-phase reactor (liquid, vapor, and catalyst). In one embodiment, the ebullated bed reactor is an ebullated bed resid hydrocracking reactor or an ebullated bed hydrocracking reactor. In certain embodiments, each ebullated bed reactor in the series has a different volume. In certain embodiments, the first ebullated reactor in the series has a volume smaller than the subsequent ebullated reactor in the series. In certain embodiments, the first ebullated reactor in the series has a volume larger than the subsequent ebullated reactor in the series. In certain embodiments, the volume of each ebullated bed reactor is in the range of about 100 m$^3$ to about 750 m$^3$, or about 100 m$^3$ to about 950 m$^3$.

In certain embodiments, the operating temperature of the ebullated bed reactors is in the range of about 370° C. to about 440° C., about 400° C. to about 440° C., or about 410° C. to about 440° C. In certain embodiments, the operating temperature of the second or subsequent ebullated bed reactors is higher than the operating temperature of the first ebullated bed reactor.

In certain embodiments, the operating pressure of the ebullated bed reactors is in the range of about 110 to about 180 bar.

The conversion of hydrocarbon feedstock, in particular resid, in the ebullated bed reactors can depend on a variety of factors, including feedstock composition, temperature and pressure, reactor space velocity, hydrogen partial pressure and catalyst type and performance. In one embodiment, each ebullated bed reactor hydroconverts about 60 to about 80 weight %, about 60 to about 90 weight %, or about 80 to about 90 weight % of the hydrocarbon feedstock. In one embodiment, each ebullated bed reactor converts about 55 to about 80 weight % of the resid in the hydrocarbon feedstock. In one embodiment, each ebullated bed reactor achieves about 60 to about 85% desulfurization of the hydrocarbon feedstock. In one embodiment, each ebullated bed reactor achieves about 40 to about 70% CCR reduction of the hydrocarbon feedstock. In one embodiment, each ebullated bed reactor achieves about 65 to about 88% demetallization of the hydrocarbon feedstock.

In one embodiment, the space velocity of each ebullated bed reactor in the system is in the range of about 0.1 to about 1 hr$^{-1}$, about 0.12 to about 0.4 hr$^{-1}$, or about 0.15 to about 0.3 hr$^{-1}$.

In one embodiment, the partial pressure of hydrogen in each ebullated reactor is in the range of about 60 to about 140 bar, or about 75 to about 125 bar.

In one embodiment, the consumption of hydrogen in each ebullated bed reactor is in the range of about 120 to about 315 Nm$^3$/m$^3$, or about 135 to about 300 Nm$^3$/m$^3$.

The catalyst particles included in the ebullated bed reactors of the systems and processes disclosed herein, comprise hydroconversion catalysts, i.e., catalysts that may be used for the hydrotreating or hydrocracking of a hydrocarbon feedstock. In certain embodiments, the hydrotreating catalyst is a catalyst composition that may be used to catalyze the hydrogenation of hydrocarbon feedstocks to increase its hydrogen content and/or remove heteroatom contaminants. A hydrocracking catalyst, for example, may include any catalyst composition that may be used to catalyze the addition of hydrogen to large or complex hydrocarbon molecules as well as the cracking of the molecules to obtain smaller, lower molecular weight molecules.

Hydroconversion catalyst compositions for use in the hydroconversion process according to embodiments disclosed herein are well known to those skilled in the art and several are commercially available. Suitable hydroconversion catalysts may include one or more elements selected from Groups 4-12 of the Periodic Table of the Elements. In some embodiments, hydroconversion catalysts may comprise, consist of, or consist essentially of one or more of nickel, cobalt, tungsten, molybdenum and combinations thereof, either unsupported or supported on a porous substrate such as silica, alumina, titania, or combinations thereof.

As supplied from a manufacturer or as resulting from a regeneration process, the hydroconversion catalysts may be in the form of metal oxides. If necessary or desired, the metal oxides may be converted to metal sulfides prior to or during use.

Generally, the hydroconversion catalysts, or catalyst particles, may be sulfided, fully or partially, or not sulfided. In some embodiments, the hydroconversion catalysts are partially or fully sulfided prior to or during use in the ebullated bed reactors. In some embodiments, the hydroconversion catalysts may be pre-sulfided and/or pre-conditioned prior to introduction to an ebullated bed reactor. In some embodiments, the hydroconversion catalysts are not pre-sulfided prior to introduction to an ebullated bed reactor. In some embodiments, the hydroconversion catalysts are at least partially sulfided prior to introduction to an ebullated bed reactor. In some embodiments, the hydroconversion catalysts are sulfided prior to introduction to an ebullated bed reactor.

In certain embodiments, the hydroconversion catalyst may be wetted and heated with a hydrocarbon liquid prior to injection into the ebullated bed reactor. In certain embodiments, the hydroconversion catalyst converts at least a portion of the hydrocarbon feedstock into at least one hydrotreated product. In certain embodiments, the hydroconversion catalyst converts at least a portion of the hydrocarbon feedstock into at least one hydrocracked product.

Catalysts used in the first and second or subsequent ebullated bed reactors may be the same or different. In certain embodiments, catalysts used in the first ebullated bed reactor may include larger pore demetallization and desulfurization catalysts having active metals content typically ranging from about 3 to about 12 wt % and pore volumes typically ranging from about 0.7 to about 1.0 cc/gm. In certain embodiments, the catalysts used in the second or subsequent ebullated bed reactors may be the same as one or more of the catalysts used in the first ebullated bed reactor. In certain embodiments, the second or subsequent ebullated bed reactors may use a dedicated smaller pore higher activity catalyst having active metals content typically ranging from about 6 to about 12 wt % and pore volumes typically ranging from about 0.6 to about 0.8 cc/gm.

In certain embodiments, the catalyst particles in the second or subsequent ebullated bed reactors comprise one or more hydrotreating catalysts, for example a high activity/high surface area/low pore volume hydrotreating catalyst. The catalyst may have physical properties of particle size distribution, size and shape designed to provide maximum attrition resistance under reactor operating conditions of minimal catalyst bed expansion but may have active metals composition and support, BET surface area and pore size distribution designed for providing high activity towards hydrodesulfurization (HDS) and hydrodenitrogenation (HDN) activity. The particle size distribution and particle shape may provide low pressure drop characteristics, particularly under a range of bed expansions, for example about 15% to about 40%, about 15% to about 70%, about 15% to about 80%, or about 15% to about 100%.

Hydrotreating catalysts that may be useful include catalysts selected from those elements known to provide catalytic hydrogenation activity. At least one metal component selected from Group 8-10 elements and/or from Group 6 elements is generally chosen. Group 6 elements may include chromium, molybdenum and tungsten. Group 8-10 elements may include iron, cobalt, nickel, ruthenium, rhodium, palladium, osmium, iridium and platinum. The amount(s) of hydrogenation component(s) in the catalyst suitably range from about 0.5% to about 10% by weight of Group 8-10 metal component(s) and from about 5% to about 25% by weight of Group 6 metal component(s), calculated as metal oxide(s) per 100 parts by weight of total catalyst, where the percentages by weight are based on the weight of the catalyst before sulfiding. The hydrogenation components in the catalyst may be in the oxidic and/or the sulphidic form. In some embodiments, the catalyst comprises one or more components of nickel and/or cobalt and one or more components of molybdenum and/or tungsten or one or more components of platinum and/or palladium. Catalysts containing nickel and molybdenum, nickel and tungsten, platinum and/or palladium are useful.

During the hydroconversion process, the catalyst (i.e., catalyst particles) may become less active or spent, such as due to metals and carbon deposition, for example. Spent catalyst may be continuously or intermittently removed from the ebullated bed reactor and may be continuously or intermittently be replaced with fresh or regenerated catalyst.

Fresh or regenerated catalyst particles may be added into the ebullated bed reactors, for example, through a top or bottom nozzle. Spent catalyst may be removed from the ebullated bed reactors, for example, through a top or bottom nozzle. In certain embodiments, the removal of spent catalyst particles is carried out in a batch process. In certain embodiments, the amount of spent catalyst particles removed and replaced, for example daily, is about 2% to about 10%.

Inter-stage Separation Step

After the initial hydroconversion step in the first ebullated bed of the reactor, the mixed product consisting of both liquid product and gas product from the first ebullated bed of the reactor is routed to an inter-stage separation vessel, where the mixed product is separated into a gas phase and a liquid phase. The gas phase may be recovered as an inter-stage gas product and the liquid phase as an inter-stage liquid product. Typically, the inter-stage gas product comprises hydrogen, hydrocarbon vapors, hydrogen sulfide ($H_2S$), ammonia ($NH_3$), water vapor ($H_2O$). The inter-stage gas product may comprise other vapors which may be expected to be produced in a hydroconversion reactor. The typical inter-stage liquid product comprises heavier boiling range hydrocarbon liquids as may be expected within a heavy oil hydroconversion reactor.

Typically, the system comprises one or more inter-stage separation vessels, which are placed after and/or between the ebullated bed reactors in the flow path. The inter-stage separation vessels separate the products into liquid and gas portions. In certain embodiments, one or more of the inter-stage separation vessels is an inter-stage flash vessel. In certain embodiments, two or more of the inter-stage separation vessels are inter-stage flash vessels. The inter-stage flash vessel can be used to separate fluid into liquid and gas portions. The flash vessels may also receive a fluid which has been pressurized and heated and is then passed through a throttling valve or nozzle into the flash drum, for example a light hydrocarbon thermal quench liquid, or fresh feed (i.e. heavy vacuum residue). Because of the large drop in pressure, part of the fluid vaporizes. The vapor is taken off overhead, while the liquid drains to the bottom of the drum, where it is withdrawn. In certain embodiments, the operating temperature of the inter-stage flash vessel is in the range of about 360° C. to about 440° C., or about 390° C. to about 420° C.

In certain embodiments, one or more of the inter-stage separation vessels is an inter-stage stripper vessel. The inter-stage stripper vessel separates one or more components from a liquid stream by a vapor stream, usually via a packed or trayed column.

In certain embodiments, one or more of the inter-stage separation vessels is an inter-stage separator. The inter-stage separator can be used to remove at least a portion of hydrogen sulfide ($H_2S$) produced in the process. In certain embodiments, the system comprises an inter-stage separator vessel in or after a first ebullated bed reactor, such that the first liquid product is treated to remove $H_2S$ prior to treatment in one or more downstream ebullated bed reactors. In certain embodiments, an inter-stage separator may be included in or after a second ebullated bed reactor such that the second mixed stream is separated prior to treatment in one or more downstream ebullated bed reactors (e.g., when the reaction section includes three or more ebullated bed reactors).

According to the embodiments, in between the first and second, or between the second and third, or between the first and second and the second and third ebullated bed reactors, will be one or two inter-stage separation vessels.

After the mixed product is separated into an inter-stage gas product and an inter-stage liquid product in the inter-stage separation vessel, the inter-stage gas product exits the inter-stage separation vessel and is routed outside of the system to a gas recovery, purification and/or compression system. The inter-stage gas product may be combined with other gas products from the system while in transit to a gas recovery, purification and/or compression system.

The inter-stage liquid product exits the inter-stage separation vessel and is directed to a second ebullated bed reactor. If the second ebullated bed reactor is the final reactor in the series, then prior to reaching the second (or final) ebullated bed reactor, inter-stage liquid product is blended or combined with a solvent comprising water.

Solvent Addition Step (Blending of Solvent With Inter-Stage Liquid Product)

A key feature of the processes according to the embodiments is the introduction of a small amount of water to the liquid product prior to treatment in the final hydroconversion step. In certain embodiments, the water combined with the inter-stage liquid product along with other solvents, i.e., a solvent or mixture comprising water is combined with the inter-stage liquid product.

In certain embodiments, the solvent comprising water is not heated, or has a temperature in the range of about 15° C. to about 50° C.

The amount of water in the solvent comprising water is the amount necessary to achieve a partial pressure of water that is greater than the partial pressure of $H_2S$ in the system. In certain embodiments, the partial pressure of the water added to the inter-stage liquid product is greater than the partial pressure of the $H_2S$ in the system.

In some embodiments, a solvent comprising water is combined with, or injected into, the inter-stage liquid product at a rate equivalent to about 0.001 wt % to about 10 wt %, about 0.001 wt % to about 0.1 wt %, about 0.1 to about 1.0 wt %, about 1.0 wt % to about 3 wt %, about 3 wt % to about 5 wt %, or about 5 wt % to about 10 wt %, of the inter-stage liquid product.

The solvent comprising water may be prepared by feeding liquid water, for example, to an injection water surge drum upstream of the system. The effluent from the injection water surge drum may be pressurized in an injection water pump, and optionally blended with other solvents. Other solvents which may be included in the solvent comprising water are, for example, residuum hydrocarbon feedstocks which may include petroleum atmospheric or vacuum residue, deasphalted oil, deasphalter pitch, hydrocracked atmospheric tower or vacuum tower bottom, straight run vacuum gas oil, hydrocracked vacuum gas oil, fluid catalytically cracked (FCC) slurry oils, as well as other similar hydrocarbon streams, and a combination of these, each of which may be straight run, process derived, hydrocracked, partially desulfurized, and/or low-metal streams.

The combination of the inter-stage liquid and the solvent comprising water is directed to a final ebullated bed reactor, which is the second ebullated bed reactor if there are two such reactors in the series or the third ebullated bed reactor if there are three such reactors in the series. If more than three ebullated bed reactors are present in the series, then the combination of the inter-stage liquid and the solvent comprising water is directed to a last ebullated bed reactor in the series.

Second or Subsequent Hydroconversion Step

The process includes further treatment of the liquid and/or mixed products of the initial hydroconversion and separation process steps by at least one additional ebullated bed reactor comprising catalyst particles. In certain embodiments, the system comprises two ebullated bed reactors comprising catalyst particles. In other embodiments, the system comprises three ebullated bed reactors comprising catalyst particles. In certain embodiments, the system comprises three or more ebullated bed reactors comprising catalyst particles. Generally, the ebullated bed reactors are arranged in series in the process flow.

Each ebullated bed reactor in the series after the initial ebullated bed reactor will receive an inter-stage liquid product from an inter-stage separation vessel. If the ebullated bed reactor is the final ebullated bed reactor in the series, the inter-stage liquid product from an inter-stage separation vessel will be combined with a solvent comprising water prior to contacting the ebullated bed reactor.

At this point in the process, the inter-stage liquid product, which may be combined with the solvent comprising water, is brought into contact with hydrogen in a second ebullated bed reactor containing catalyst particles thereby producing a second liquid stream and a second mixed stream consisting of liquid products and gas products. The catalyst particles in the second ebullated bed reactor may be the same or different type of catalyst particles as those contained in the first ebullated reactor. Within the ebullated bed reactor, the inter-stage liquid product, which may be combined with the solvent comprising water, flows from the plenum mixing zone to the catalytic reaction zone for contact with catalyst particles (e.g. hydroconversion catalyst particles). In certain embodiments, this occurs through a distribution grid. The inter-stage liquid product, which may be combined with the solvent comprising water, hydrogen and catalyst particles react to form reaction products, which are recovered as second hydroconverted products in the separation zone of the ebullated bed reactor.

In the separation zone, the reaction products are separated into a liquid product and a mixed product consisting of both liquid product and gas product. Generally, the liquid product is at least 80% liquid by weight. The mixed product comprises about 80% to about 95%, or about 90% to 95% liquid by weight and about 5% to about 20%, or about 5% to about 10%, gas by weight. A portion of the second liquid product is pumped into the plenum mixing zone of the second ebullated bed reactor through a recirculation line.

According to the embodiments, the mixed product of the final ebullated bed reactor in the series within the system is routed to a high-temperature and high-pressure separation vessel.

In certain embodiments, the second ebullated bed reactor is the final ebullated bed reactor in the series within the system, and the mixed product of the second ebullated bed reactor is routed to a high-temperature and high-pressure separation vessel.

In certain embodiments, the second ebullated bed reactor is not the final ebullated bed reactor in the series within the system. In one embodiment, the mixed product consisting of both liquid product and gas product is routed to a second inter-stage separation vessel, and the second inter-stage liquid product exits the second inter-stage separation vessel and is directed to a third ebullated bed reactor. If the third ebullated bed reactor is the final reactor in the series, then prior to reaching the third (or final) ebullated bed reactor, the second inter-stage liquid product is blended or combined with a solvent comprising water.

In certain embodiments, the third ebullated bed reactor is the final ebullated bed reactor in the series within the system, and the mixed product of the third ebullated bed reactor is routed to a high-temperature and high-pressure separation vessel.

Final (High Temperature and High Pressure) Separation Step

After the final reaction in the final ebullated bed of the reactor, the mixed product consisting of both liquid product and gas product from the final ebullated bed of the reactor is routed to a high-temperature and high-pressure separation vessel, where the mixed product is separated into a gas phase and a liquid phase at a temperature of at least of about 360° C. and a pressure of at least about 110 bars. In certain embodiments, the high-temperature and high-pressure separation vessel operates at a temperature in the range of about 360° C. to about 440° C. and a pressure in the range of about 110 bars to about 180 bars. The gas phase, i.e., final gas product, exits the separation vessel and may be combined with other gas products from the system while in transit to a gas recovery, purification and/or compression system. The liquid phase is recovered as the final liquid product of the process and is routed outside of the system for further separation and distillation (section 4).

Typically, the system comprises one or more high-temperature and high-pressure separation vessels, which are placed after the final ebullated bed reactor in the flow path.

After the mixed product is separated into a final gas product and a final liquid product in a high-temperature and high-pressure separation vessel, the final gas product exits the high-temperature and high-pressure separation vessel, and is routed outside of the system to a gas recovery, purification and/or compression system. The final gas product may be combined with other gas products from the system while in transit to a gas recovery, purification and/or compression system.

The final liquid product exits the high-temperature and high-pressure separation vessel, and is routed outside of the system for further separation and distillation.

Typically, the final gas product comprises hydrogen, hydrocarbon vapors, hydrogen sulfide ($H_2S$), ammonia ($NH_3$), water vapor ($H_2O$). The final gas product may comprise other vapors which may be expected to be produced in a hydroconversion reactor. The final liquid product comprises hydrocarbon liquids, for example hydrocarbon liquids with lower boiling ranges that the heavy hydrocarbon feedstock.

Second or Subsequent Inter-stage Separation Step

In certain embodiments, after the hydroconversion step in the second ebullated bed of the reactor, the mixed product consisting of both liquid product and gas product from the second ebullated bed of the reactor is routed to an inter-stage separation vessel (e.g. a second or subsequent inter-stage separation vessel), where the mixed product is separated into a gas phase and a liquid phase. The gas phase may be recovered as an inter-stage gas product and the liquid phase as an inter-stage liquid product.

As described herein, each inter-stage separation vessel can be an inter-stage flash vessel, inter-stage stripper vessel, or an inter-stage separator.

After the mixed product is separated into an inter-stage gas product and an inter-stage liquid product in the inter-stage separation vessel, the inter-stage gas product exits the inter-stage separation vessel and is routed outside of the system to a gas recovery, purification and/or compression system. The inter-stage gas product may be combined with other gas products from the system while in transit to a gas recovery, purification and/or compression system.

The inter-stage liquid product of the second or subsequent inter-stage separation vessel exits the inter-stage separation vessel and is directed to a third or subsequent ebullated bed reactor. If the third ebullated bed reactor is the final reactor in the series, then prior to reaching the third ebullated bed reactor, the inter-stage liquid product is blended or combined with a solvent comprising water.

A block flow diagram for a system and process for hydroconversion in accordance with the embodiments disclosed herein is illustrated in FIG. 1.

As shown in FIG. 1, the system comprises a Hydrocarbon Feed and Hydrogen Feed Stream 101, a First Ebullated Bed Reactor 110, an Inter-Stage Flash Vessel 120, a Second Ebullated Bed Reactor 130, and High-Pressure/High Temperature Separation Vessel 140.

The First Ebullated Bed Reactor 110 comprises catalyst particles (not shown), Plenum Mixing Zone 110A, Catalytic Reaction Zone 110B, and Separation Zone 110C. The Second Ebullated Bed Reactor 130 comprises catalyst particles (not shown), Plenum Mixing Zone 130A, Catalytic Reaction Zone 130B, and Separation Zone 130C.

The Hydrocarbon Feed and Hydrogen Feed Stream 101 from Section 1 enters Plenum Mixing Zone 110A where it is mixed with the First Liquid Stream (e.g. liquid product from Separation Zone 110C which is continuously recycled back into the Plenum Mixing Zone 110A) to form a Plenum Mixing Zone 110A Product, which then passes into the Catalytic Reaction Zone 110B. In certain embodiments, the Plenum Mixing Zone 110A Product passes through a distribution grid into the Catalytic Reaction Zone 110B.

Catalyst particles reside in the Catalytic Reaction Zone 110B. Gas Products and Liquid Products formed from the interaction of the hydrocarbons, hydrogen and catalyst particles in the First Ebullated Bed Reactor 110 flow from Catalytic Reaction Zone 110B into Separation Zone 110C.

Gas Products and Liquid Products are at least partially separated in Separation Zone 110C. A portion of the Liquid Product from Separation Zone 110C is recycled back (i.e., recirculated) into Mixing Zone 110A as mentioned above. Generally, when the Liquid Product from Separation Zone 110C is recirculated into Mixing Zone 110A, it is mixed with fresh (i.e., new) Hydrocarbon Feed. In certain embodiments, the proportion of the Liquid product to the fresh Hydrocarbon Feed in this step is in the range of about 4:1 to 10:1 by volume.

Gas Products and the remaining Liquid Product from Separation Zone 110C leaves First Ebullated Bed Reactor 110 as First Mixed Stream 111 and is routed to the Inter-Stage Flash Vessel 120 where the gases and liquids are separated. Inter-Stage Gas Product 121 exits Inter-Stage Flash Vessel 120 and combines with Gas Product 141, which is formed from flashing inside High-Pressure/High Temperature Separation Vessel 140, and Combined Stream 142 is routed outside of the system to a gas recovery, purification and compression system (Section 3).

Inter-Stage Liquid Product 123 exits Inter-Stage Flash Vessel 120 and combines with Solvent 511 (i.e. a solvent comprising water) from Section 5 to form the Blended Stream 124. Blended Stream 124 is fed into the Second Ebullated Bed Reactor 130 through Plenum Mixing Zone 130A, where it is mixed with the Second Liquid Stream (e.g. liquid product from Separation Zone 130C which is continuously recycled back into the Plenum Mixing Zone 130A) to form a Plenum Mixing Zone 130A Product, which then passes into the Catalytic Reaction Zone 130B. In certain embodiments, the Plenum Mixing Zone 130A Product passes through a distribution grid into the Catalytic Reaction Zone 130B.

Catalyst particles reside in the Catalytic Reaction Zone 130B. The catalyst particles in Catalytic Reaction Zone 130B may be the same or different type of catalyst particles as those contained in Catalytic Reaction Zone 110B. Gas Products and Liquid Products formed from the interaction of the hydrocarbons, hydrogen and catalyst particles in the Second Ebullated Bed Reactor 130 flow from Catalytic Reaction Zone 130B into Separation Zone 130C.

Gas Products and Liquid Products are at least partially separated in Separation Zone 130C. A portion of the Liquid Product from Separation Zone 130C is recycled back into Mixing Zone 130A as mentioned above.

Gas Products and the remaining Liquid Product from Separation Zone 130C leaves Second Ebullated Bed Reactor 130 as Second Mixed Stream 131 and is routed to the High-Pressure/High Temperature Separation Vessel 140 where the gases and liquids are separated. Gas Product 141 exits High-Pressure/High Temperature Separation Vessel 140 and combines with Gas Product 121, which is formed from flashing inside Inter-Stage Flash Vessel 120, and is routed outside of the system to a gas recovery, purification and compression (Section 3) as described earlier.

Liquid Product 143 exits the High-Pressure/High-Temperature Separation Vessel and is routed outside of the system for further separation and distillation (Section 4).

Fresh Catalyst from Section 2 Catalyst Handling may be injected into either Catalytic Reaction Zone 110B or Catalytic Reaction Zone 130B via a Top Reactor Nozzle, 211A/211B or Bottom Reactor nozzle 213A/213B.

Spent Catalyst may be withdrawn from Catalytic Reaction Zone 110B or Catalytic Reaction Zone 130B via a Top Reactor Nozzle, 211A/211B or Bottom Reactor nozzle 213A/213B and sent to Section 2 Catalyst Handling Area.

In addition to the forgoing, the various embodiments of the present disclosure include, but are not limited to, the embodiments set forth in the following clauses.

Clause 1. A process for hydroconversion of a hydrocarbon feedstock comprising:
  (i) contacting the hydrocarbon feedstock and hydrogen in a first ebullated bed reactor containing catalyst particles to produce a first liquid stream and a first mixed stream, the first mixed stream consisting of liquid products and gas products;
  (ii) separating the first mixed stream in an inter-stage separation vessel to form an inter-stage gas product and an inter-stage liquid product;
  (iii) combining the inter-stage liquid product with a solvent comprising water in an amount of about 0.001 weight % to about 10 weight % of the inter-stage liquid product;
  (iv) contacting the inter-stage liquid product and the solvent in a second ebullated bed reactor containing catalyst particles to produce a second liquid stream and a second mixed stream, the second mixed stream consisting of liquid products and gas products;
  (v) separating the second mixed stream in a high temperature and high pressure separation vessel to form a final gas product and a final liquid product; and
  wherein at least a portion of the first liquid stream is returned to the first ebullated bed reactor containing catalyst particles and at least a portion of the second liquid stream is returned to the second ebullated bed reactor containing catalyst particles.

Clause 2. A process for hydroconversion of a hydrocarbon feedstock comprising:
  (i) contacting the hydrocarbon feedstock and hydrogen in a first ebullated bed reactor containing catalyst particles to produce a first liquid stream and a first mixed stream, the first mixed stream consisting of liquid products and gas products;
  (ii) separating the first mixed stream in an inter-stage separation vessel to form an inter-stage gas product and an inter-stage liquid product;
  (iii) contacting the inter-stage liquid product and a solvent in a second ebullated bed reactor containing catalyst particles to produce a second liquid stream and a second mixed stream, the second mixed stream consisting of liquid products and gas products;
  (iv) separating the second mixed stream in a second inter-stage separation vessel to form a second inter-stage gas product and a second inter-stage liquid product;
  (v) combining the second inter-stage liquid product with a second solvent comprising water in an amount of about 0.001 weight % to about 10 weight % of the second inter-stage liquid product;
  (vi) contacting the second inter-stage liquid product and the second solvent in a third ebullated bed reactor containing catalyst particles to produce a third liquid stream and a third mixed stream consisting of liquid products and gas products;
  (vii) separating the third mixed stream in a high temperature and high pressure separation vessel to form a final gas product and a final liquid product; and
  wherein at least a portion of the first liquid stream is returned to the first ebullated bed reactor containing catalyst particles, at least a portion of the second liquid stream is returned to the second ebullated bed reactor containing catalyst particles and at least a portion of the third liquid stream is returned to the third ebullated bed reactor containing catalyst particles.

Clause 3. The process of clause 1 or clause 2, wherein the hydrocarbon feedstock comprises residuum hydrocarbon feedstock.

Clause 4. The process of clause 3, wherein the residuum hydrocarbon feedstocks are selected from refinery and other hydrocarbon streams which include some contaminant metals.

Clause 5. The process of clause 3, wherein the residuum hydrocarbon feedstocks comprise petroleum atmospheric residue, vacuum residue, deasphalted oil, deasphalter pitch, hydrocracked atmospheric tower bottom, vacuum tower bottom, straight run vacuum gas oil, hydrocracked vacuum gas oil, fluid catalytically cracked (FCC) slurry oils, or a combination thereof.

Clause 6. The process of clause 1 or clause 2, wherein catalyst particles comprise one or more elements selected from Groups 4-12 of the Periodic Table of the Elements.

Clause 7. The process of clause 6, wherein catalyst particles comprise one or more of nickel, cobalt, tungsten, molybdenum and combinations thereof.

Clause 8. The process of clause 7, wherein the nickel, cobalt, tungsten, molybdenum and combinations thereof are supported on a porous substrate such as silica, alumina, titania, or combinations thereof.

Clause 9. The process of clause 1 or clause 2, wherein the catalyst particles are fully or partially sulfided prior to or during use in the ebullated bed reactors.

Clause 10. The process of clause 1 or clause 2, wherein the hydrocarbon feedstock and hydrogen are heated and combined prior to entering the first ebullated bed reactor containing catalyst particles.

Clause 11. The process of clause 1, wherein the process further comprises contacting the first mixed stream of step (i) with an additional ebullated bed reactor containing catalyst particles prior to step (ii).

Clause 12. The process of clause 1 or clause 11, further comprising separating the first mixed stream in an inter-stage separation vessel to form an inter-stage gas product and an inter-stage liquid product prior to step (ii).

Clause 13. The process of clause 1, wherein the process comprises one or more additional ebullated bed reactors comprising catalyst particles and, optionally, one or more additional inter-stage separation vessels, and wherein the solvent is combined with the inter-stage liquid product of a final inter-stage separation vessel in the process and the combined inter-stage liquid product and solvent are contacted with a final ebullated bed reactor containing catalyst particles in the process.

While the disclosure includes a limited number of embodiments, those skilled in the art, having the benefit of this disclosure, will appreciate that other embodiments may be devised which do not depart from the scope of the present disclosure.

What is claimed is:

1. A process for hydroconversion of a hydrocarbon feedstock comprising:

(i) contacting the hydrocarbon feedstock and hydrogen in a first ebullated bed reactor containing first catalyst extrudate to produce a first liquid stream and a first mixed stream, the first mixed stream consisting of liquid products and gas products;

(ii) separating the first mixed stream in an inter-stage separation vessel to form an inter-stage gas product and an inter-stage liquid product;

(iii) combining the inter-stage liquid product with a solvent comprising water in an amount of about 0.001 weight % to about 10 weight % of the inter-stage liquid product;

(iv) contacting the inter-stage liquid product and the solvent in a second ebullated bed reactor containing second catalyst extrudate to produce a second liquid stream and a second mixed stream, the second mixed stream consisting of liquid products and gas products;

(v) separating the second mixed stream in a high temperature and high pressure separation vessel to form a final gas product and a final liquid product; and wherein at least a portion of the first liquid stream is returned to the first ebullated bed reactor containing the first catalyst extrudate and at least a portion of the second liquid stream is returned to the second ebullated bed reactor containing the second catalyst extrudate.

2. The process of claim 1, wherein the hydrocarbon feedstock comprises residuum hydrocarbon feedstock.

3. The process of claim 2, wherein the residuum hydrocarbon feedstocks are selected from refinery and other hydrocarbon streams which include some contaminant metals.

4. The process of claim 2, wherein the residuum hydrocarbon feedstocks comprise petroleum atmospheric residue, vacuum residue, deasphalted oil, deasphalter pitch, hydrocracked atmospheric tower bottom, vacuum tower bottom, straight run vacuum gas oil, hydrocracked vacuum gas oil, fluid catalytically cracked (FCC) slurry oils, or a combination thereof.

5. The process of claim 1, wherein the first catalyst extrudate and the second catalyst extrudate comprise one or more elements selected from Groups 4-12 of the Periodic Table of the Elements.

6. The process of claim 5, wherein the first catalyst extrudate and the second catalyst extrudate comprise one or more of nickel, cobalt, tungsten, molybdenum and combinations thereof and wherein the first catalyst extrudate has a pore volume of 0.7 to 1.0 cc/gm and the second catalyst extrudate has a pore volume of 0.6 to 0.8 cc/gm.

7. The process of claim 6, wherein the nickel, cobalt, tungsten, molybdenum and combinations thereof are supported on a porous substrate such as silica, alumina, titania, or combinations thereof.

8. The process of claim 1, wherein the first catalyst extrudate and the second catalyst extrudate are fully or partially sulfided prior to or during use in the ebullated bed reactors.

9. The process of claim 1, wherein the hydrocarbon feedstock and hydrogen are heated and combined prior to entering the first ebullated bed reactor containing the first catalyst extrudate.

10. The process of claim 1, wherein the process further comprises contacting the first mixed stream of step (i) with an additional ebullated bed reactor containing additional catalyst extrudate prior to step (ii).

11. The process of claim 1, further comprising separating the first mixed stream in an inter-stage separation vessel to form an inter-stage gas product and an inter-stage liquid product prior to step (ii).

12. The process of claim 1, wherein the process comprises one or more additional ebullated bed reactors comprising additional catalyst extrudate and, optionally, one or more additional inter-stage separation vessels, and wherein the solvent is combined with the inter-stage liquid product of a final inter-stage separation vessel in the process and the combined inter-stage liquid product and solvent are contacted with a final ebullated bed reactor containing final catalyst extrudate in the process.

13. A process for hydroconversion of a hydrocarbon feedstock comprising:

(i) contacting the hydrocarbon feedstock and hydrogen in a first ebullated bed reactor containing first catalyst extrude to produce a first liquid stream and a first mixed stream, the first mixed stream consisting of liquid products and gas products;

(ii) separating the first mixed stream in an inter-stage separation vessel to form an inter-stage gas product and an inter-stage liquid product;

(iii) contacting the inter-stage liquid product and a solvent in a second ebullated bed reactor containing second catalyst extrudate to produce a second liquid stream and a second mixed stream, the second mixed stream consisting of liquid products and gas products;

(iv) separating the second mixed stream in a second inter-stage separation vessel to form a second inter-stage gas product and a second inter-stage liquid product;

(v) combining the second inter-stage liquid product with a second solvent comprising water in an amount of about 0.001 weight % to about 10 weight % of the second inter-stage liquid product;

(vi) contacting the second inter-stage liquid product and the second solvent in a third ebullated bed reactor containing third catalyst extrudate to produce a third liquid stream and a third mixed stream consisting of liquid products and gas products;

(vii) separating the third mixed stream in a high temperature and high pressure separation vessel to form a final gas product and a final liquid product; and wherein at least a portion of the first liquid stream is returned to the first ebullated bed reactor containing the first catalyst extrudate, at least a portion of the second liquid stream is returned to the second ebullated bed reactor containing the second catalyst extrudate and at least a portion of the third liquid stream is returned to the third ebullated bed reactor containing the third catalyst extrudate.

14. The process of claim 13, wherein the hydrocarbon feedstock comprises residuum hydrocarbon feedstock.

15. The process of claim 14, wherein the residuum hydrocarbon feedstocks are selected from refinery and other hydrocarbon streams which include some contaminant metals.

16. The process of claim 14, wherein the residuum hydrocarbon feedstocks comprise petroleum atmospheric residue, vacuum residue, deasphalted oil, deasphalter pitch, hydrocracked atmospheric tower bottom, vacuum tower bottom, straight run vacuum gas oil, hydrocracked vacuum gas oil, fluid catalytically cracked (FCC) slurry oils, or a combination thereof.

17. The process of claim 13, wherein the first catalyst extrudate, the second catalyst extrudate, and the third catalyst extrudate comprise one or more elements selected from Groups 4-12 of the Periodic Table of the Elements.

18. The process of claim 17, wherein the first catalyst extrudate, the second catalyst extrudate, and the third catalyst extrudate comprise one or more of nickel, cobalt, tungsten, molybdenum and combinations thereof and wherein the first catalyst extrudate has a pore volume of 0.7 to 1.0 cc/gm and the second catalyst extrudate and third catalyst extrudate have a pore volume of 0.6 to 0.8 cc/gm.

19. The process of claim 18, wherein the nickel, cobalt, tungsten, molybdenum and combinations thereof are supported on a porous substrate such as silica, alumina, titania, or combinations thereof.

20. The process of claim 13, wherein the first catalyst extrudate, the second catalyst extrudate, and the third catalyst extrudate are fully or partially sulfided prior to or during use in the ebullated bed reactors.

* * * * *